US 9,645,644 B2

(12) United States Patent
Kim

(10) Patent No.: US 9,645,644 B2
(45) Date of Patent: May 9, 2017

(54) CONTROLLING VISUAL AND TACTILE FEEDBACK OF TOUCH INPUT

(71) Applicant: KT CORPORATION, Gyeonggi-do (KR)

(72) Inventor: Jun-Won Kim, Gyeonggi-do (KR)

(73) Assignee: KT CORPORATION, Gyeonggi-do (KR)

( * ) Notice: Subject to any disclaimer, the term of this patent is extended or adjusted under 35 U.S.C. 154(b) by 225 days.

(21) Appl. No.: 14/308,930

(22) Filed: Jun. 19, 2014

(65) Prior Publication Data
US 2014/0380155 A1    Dec. 25, 2014

(30) Foreign Application Priority Data
Jun. 19, 2013  (KR) .................. 10-2013-0070594

(51) Int. Cl.
| | |
|---|---|
| *G06F 3/048* | (2013.01) |
| *G06F 3/01* | (2006.01) |
| *G06F 3/0486* | (2013.01) |
| *G06F 3/0488* | (2013.01) |
| *G06F 3/041* | (2006.01) |
| *G06F 3/0485* | (2013.01) |

(52) U.S. Cl.
CPC ............ *G06F 3/016* (2013.01); *G06F 3/0416* (2013.01); *G06F 3/0485* (2013.01); *G06F 3/0486* (2013.01); *G06F 3/0488* (2013.01)

(58) Field of Classification Search
CPC .... G06F 3/0416; G06F 3/0485; G06F 3/0486; G06F 3/0488

USPC ....................................................... 715/701
See application file for complete search history.

(56) References Cited

U.S. PATENT DOCUMENTS

| | | | |
|---|---|---|---|
| 9,262,073 B2 * | 2/2016 | Howard | .............. G06F 3/04815 |
| 2008/0184118 A1 | 7/2008 | Yun et al. | |
| 2010/0037167 A1 | 2/2010 | Son et al. | |
| 2010/0306650 A1 | 12/2010 | Oh et al. | |
| 2011/0218953 A1* | 9/2011 | Hale | ...................... G06Q 10/00 |
| | | | 706/46 |
| 2013/0047109 A1 | 2/2013 | Essex et al. | |
| 2013/0254693 A1 | 9/2013 | Oh | |
| 2014/0258860 A1 * | 9/2014 | Subramanian | .......... G06F 3/016 |
| | | | 715/716 |

(Continued)

FOREIGN PATENT DOCUMENTS

| | | |
|---|---|---|
| JP | 2013-117972 A | 6/2013 |
| KR | 10-2008-0071452 A | 8/2008 |

(Continued)

*Primary Examiner* — David Phantana Angkool
(74) *Attorney, Agent, or Firm* — IP Legal Services, LLC

(57) ABSTRACT

Described embodiments relate to an interactive user interface that enables a user to intuitively recognize correlation between a selected object and a desired operation to be performed. Such an interactive user interface may be provided by obtaining a priority of a selected object upon detection of a designated touch input made on the selected object for moving the selected object from a first display region to a second display region in a graphic user interface, determining feedback attributes of the detected designated touch input based on the obtained priority of the selected object, and outputting visual and tactile feedback of the detected designated touch input based on the determined feedback attributes.

19 Claims, 7 Drawing Sheets

(56) References Cited

U.S. PATENT DOCUMENTS

| | | | | |
|---|---|---|---|---|
| 2014/0276057 A1* | 9/2014 | Lee | ................. | A61B 8/469 600/441 |
| 2014/0380155 A1* | 12/2014 | Kim | ................. | G06F 3/016 715/701 |
| 2015/0020013 A1* | 1/2015 | Kim | ................. | G06F 3/0488 715/769 |
| 2015/0067495 A1* | 3/2015 | Bernstein | ................. | G06F 3/016 715/702 |
| 2015/0091877 A1* | 4/2015 | Kim | ................. | G06F 3/0488 345/178 |
| 2015/0099467 A1* | 4/2015 | Kang | ................. | H04W 8/005 455/41.2 |
| 2015/0339524 A1* | 11/2015 | Yang | ................. | G06F 3/0488 382/189 |
| 2015/0370472 A1* | 12/2015 | Privault | ................. | G06F 3/04883 715/769 |
| 2016/0026384 A1* | 1/2016 | Hwang | ................. | G06F 3/04886 715/773 |

FOREIGN PATENT DOCUMENTS

| | | |
|---|---|---|
| KR | 10-2010-0019024 A | 2/2010 |
| KR | 10-2010-0127382 A | 12/2010 |
| KR | 10-2012-0071590 A | 7/2012 |

\* cited by examiner

FIG. 2
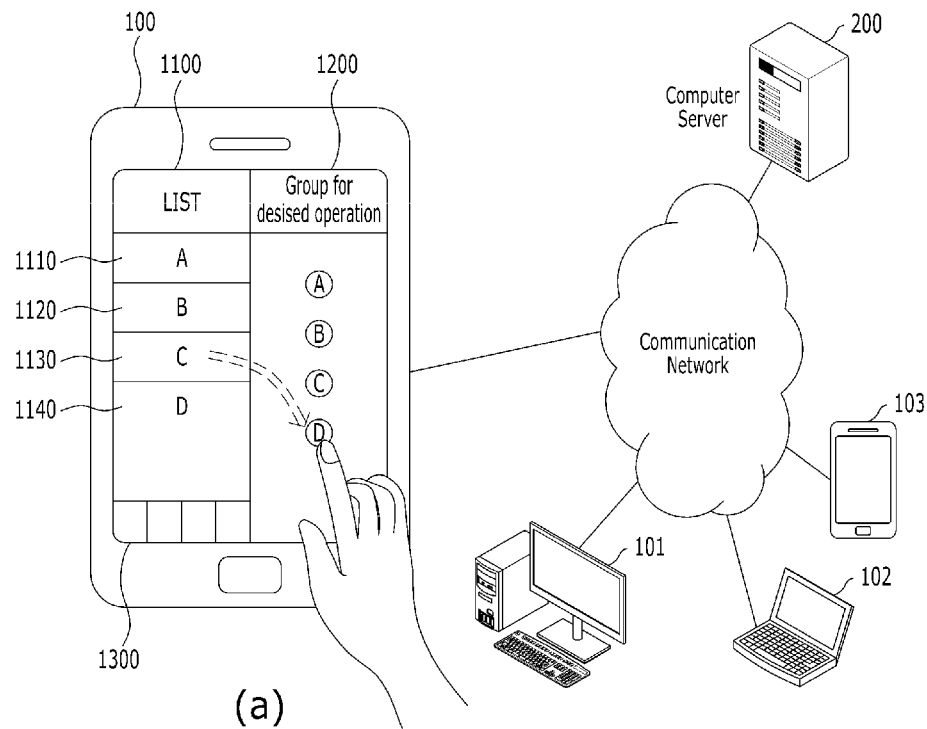
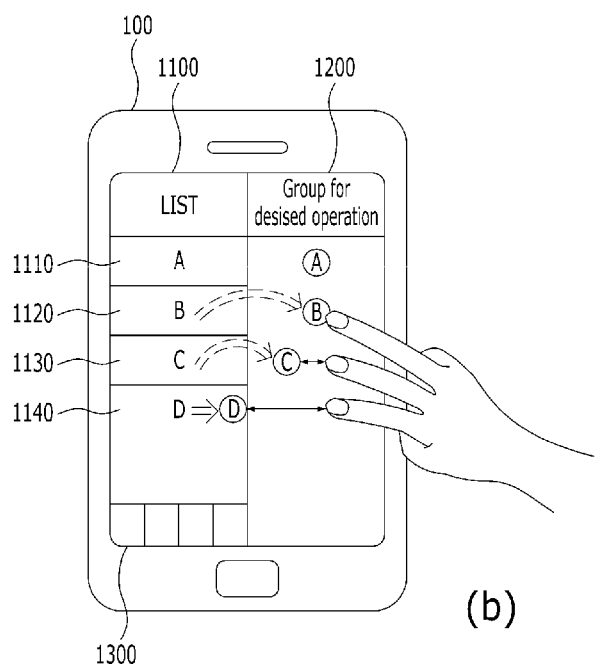

CONTROLLING VISUAL AND TACTILE FEEDBACK OF TOUCH INPUT

CROSS REFERENCE TO PRIOR APPLICATIONS

The present application claims priority under 35 U.S.C. §119 to Korean Patent Application No. 10-2013-0070594 (filed on Jun. 19, 2013), which is hereby incorporated by reference in its entirety.

BACKGROUND OF THE INVENTION

The present disclosure relates to a user interface of user equipment and, more particularly, to an interactive user interface for enabling a user to intuitively recognize correlation of an object in a one display region with the other display region by controlling visual and tactile feedback of a touch input made on the object.

User equipment such as a smart phone provides a user interface for enabling a user to drag (e.g., swipe) an object (e.g., icon) from one display region to the other. Due to convenience and easy of using, such user interface becomes so popular. Users use this interface to control mobile devices by dragging an email, a photo, a music file, or icons found on Internet to a place where he or she wishes to copy or move such files to.

SUMMARY OF THE INVENTION

This summary is provided to introduce a selection of concepts in a simplified form that is further described below in the Detailed Description. This summary is not intended to identify key features or essential features of the claimed subject matter, nor is it intended to be used to limit the scope of the claimed subject matter.

Embodiments of the present invention overcome the above disadvantages and other disadvantages not described above. Also, the present invention is not required to overcome the disadvantages described above, and an embodiment of the present invention may not overcome any of the problems described above.

In accordance with an aspect of the present invention, an interactive user interface may be provided to enable a user for intuitively recognizing correlation of an object with a desired operation to be performed with the object.

In accordance with another aspect of the present invention, user equipment may control visual and tactile feedback of a designated touch input made on an object based on correlation between the object and a target operation to be performed with the object.

In accordance with another aspect of the present invention, a method may be provided for providing an interactive user interface. The method may include obtaining a priority of a selected object upon detection of a designated touch input made on the selected object for moving the selected object from a first display region to a second display region in a graphic user interface, determining feedback attributes of the detected designated touch input based on the obtained priority of the selected object, and outputting visual and tactile feedback of the detected designated touch input based on the determined feedback attributes.

The obtaining a priority of a selection object may include obtaining priority information in associated with the selected object from a memory of a user equipment, and determining the priority of the selected object based on the obtained priority information.

The obtaining a priority of a selected object may include obtaining the priority previously assigned to the selected object.

The obtaining a priority of a selected object may include requesting priority information to an associated server and receiving the requested priority information from the associated server and determining the priority of the selected object based on the received priority information.

The priority may represent correlation between the selected object and a desired operation to be performed with the selected object.

Prior to the obtaining a priority of a selected object, the method may further include detecting a touch input made on the graphic user interface, determining whether the detected touch input is the designated touch input, and performing the obtaining a priority of a selected object when the detected touch input is determined as the designated touch input. The designated touch input may be a touch input that moves at least one object from one display region to the other in the graphic user interface. The designated touch input may include at least one of a single drag touch input, a multi drag touch input, a single swipe touch input, and a multi swipe touch input.

Prior to the obtaining a priority of a selected object, the method may further include determining whether the designated touch input is made on a graphic user interface produced as a result of a designated application and performing the obtaining a priority of a selected object when the designated touch input is determined as making on a graphic user interface produced as a result of a designated application.

The determining feedback attribute of the detected designated touch input may include determining touch input attributes of the detected designated touch input, and determining the feedback attributes of the detected designated touch input based on the determined touch input attributes together with the priority of the selected object.

The determining touch input attributes may include collecting information on the detected designated touch input, determining a touch input direction, as the touch input attribute, based on the collected information, and calculating a touch input speed, as the touch input attribute, based on the collected information.

The collected information may include at least one of information on an initial location of detecting the designated touch input, information on a traveling location of the detected designated touch input, and information on a traveling direction of the detected designated touch input.

The determining feedback attributes of the detected designated touch input may include determining a resistance level, as the feedback attributes, in proportional to a level of the obtained priority of the selected object; and assigning the determined resistance level to the detected designated touch input associated with the selected object.

The determining feedback attributes of the detected designated touch input may include assigning a comparatively high resistance level, as the feedback attribute, to the detected designated touch input associated with the selected object having a comparatively high priority; and assigning a comparatively low resistance level, as the feedback attribute, to the detected designated touch input associated with the selected object having a comparatively low priority.

The outputting visual and tactile feedback of the detected designated touch input may include determining feedback attributes assigned to the detected designated touch input; and controlling visual and tactile feedback of the detected designated touch input to enable a user to intuitively recognize correlation between the selected object and a desired operation to be performed with the selected object while performing the detected designated touch input.

The outputting visual and tactile feedback of the detected designated touch input may include determining a resistance level assigned to the detected designated touch input; and controlling visual and tactile feedback of the detected designated touch input based on the determined resistance level.

When the assigned resistance level is comparatively low, the selected object may be displayed moving comparatively slow and followed by the detected designated touch input with a predetermined distance, and tactile feedback of the detected designated touch input may be generated to make a user feel moving a heavy object. When the assigned resistance level is comparatively high, the selected object may be displayed moving comparatively fast and closely followed by the detected designated touch input, and tactile feedback of the detected designated touch input may be generated to make a user feel moving a light object.

The method may further include displaying objects in the second display region in a predetermined order based on a priority assigned to each object after the objects are moved from the first display region to the second display region. The displaying objects may include obtaining priorities of the objects in the second display region, sorting the objects based on the obtained priority, and determining a display location of each object in the second display region according to the sorting order.

In accordance with at least one embodiment, user equipment may be provided for providing an interactive user interface that enables a user to intuitively recognize correlation between a selected object and a desired application to be performed with the selected object. User equipment may be configured to obtain a priority of a selected object upon detection of a designated touch input made on the selected object for moving the selected object from a first display region to a second display region in a graphic user interface, determine feedback attributes of the detected designated touch input based on the obtained priority of the selected object, and output visual and tactile feedback of the detected designated touch input based on the determined feedback attributes.

BRIEF DESCRIPTION OF THE DRAWINGS

The above and/or other aspects of the present invention will become apparent and more readily appreciated from the following description of embodiments, taken in conjunction with the accompanying drawings, of which:

FIG. 2 illustrates user equipment providing an interactive user interface that enables a user to intuitively recognize correlation between a selected object and a desired operation to be performed in accordance with at least one embodiment;

DETAILED DESCRIPTION OF THE INVENTION

Figure 1:
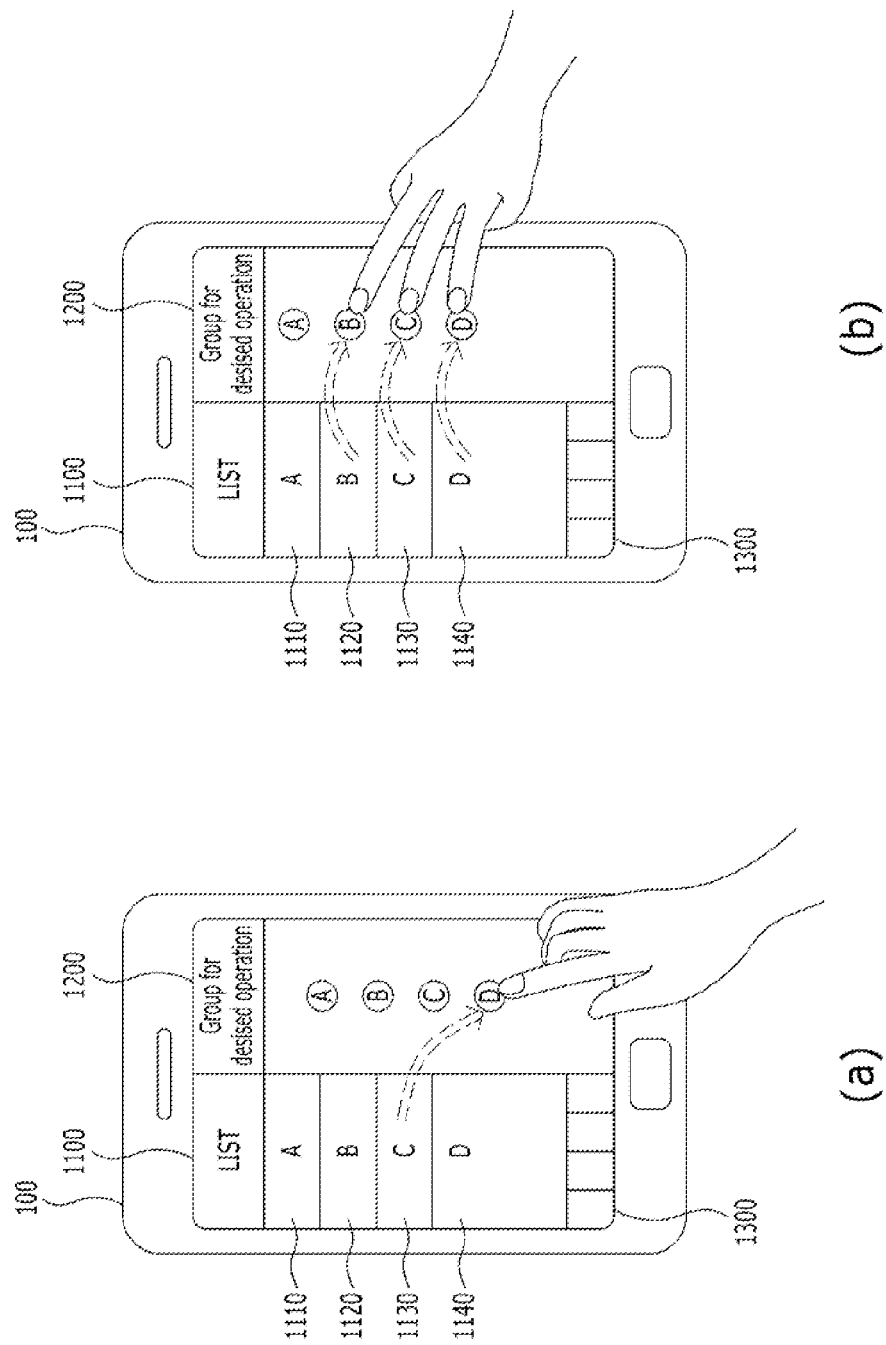
FIG. 1 illustrates a graphic user interface that enables a user to interact with user equipment in accordance with at least one embodiment.

Reference will now be made in detail to embodiments of the present invention, examples of which are illustrated in the accompanying drawings, wherein like reference numerals refer to like elements throughout. The embodiments are described below, in order to explain the present invention by referring to the figures.

FIG. 1 illustrates a graphic user interface that enables a user to interact with user equipment in accordance with at least one embodiment. Referring to diagrams (a) and (b) of FIG. 1, graphic user interface 1000 may include a plurality of display regions, for example, first display region 1100 to third display region 1300. Each one of display regions may include at least one object, for example, objects 1110 to 1130. Such a graphic user interface may be produced and displayed on a display device (e.g., a touch screen) of the user equipment as a result of executing a predetermined application installed in the user equipment. Through the graphic user interface displayed on the touch screen, a user interacts with the user equipment to control the user equipment and to perform a predetermined task or operation.

In order to interact with the graphic user interface, a user makes touch inputs on the graphic user interface displayed on the touch screen of the user equipment. The touch input may include a tab input, a double tap input, a long press input, a drag and drop input, a swiping input, a long tab input, and so forth. Each touch input may be used for performing an associated task such as selecting one object, executing a selected object, and moving a selected object from one display region to the other. For example, a user may make a tab input on an object to select the object from a plurality of displayed objects. Furthermore, a user may make a drag and drop touch input on the selected object in order to move the selected object from one display region to the other.

For example, graphic user interface 1000 may be produced and displayed on a touch screen of user equipment as a result of an application for setting a video conference with multiple persons. In this case, graphic user interface 1000 may include first display region 1100 for showing candidate persons for a predetermined video conference and selecting participating persons from the candidate persons and second display region 1200 for grouping the selected persons and creating a predetermined video conference with details. First display region 1100 may be referred to as an object display region and second display region 1200 may be referred to as a destination display region.

As another example, graphic user interface 1000 may be produced and displayed on a touch screen of user equipment, as a result of an application for perform an operation consist of a plurality of tasks. In this case, graphic user interface 1000 may include first display region 1100 for showing various candidate tasks that can be performed and selecting at least one from the candidate tasks and second display region 1200 for grouping the selected tasks and perform a target operation for sequentially and automatically perform the selected candidate tasks.

To select at least one of objects and group the selected objects, a user may make touch inputs on target objects displayed on graphic user interface 1000. For example, as shown in a diagram (a) of FIG. 1, a tab input may be made on D object 1140 to select. Then, a drag and drop input or a swipe input may be made on selected D object 1140 to move selected D object 1140 from first display region 1100 to second display region 1200 for grouping selected D object 1140 with the other objects, which are previously selected and moved, such as A, B, and C objects 1110 to 1130. After selecting and grouping the objects, a user may make another tab input in one of objects in third display region 1300 to initiate a predetermined operation based on the grouped objects in second display region 1200. In case of the application for scheduling a video conference, when a user makes a tab input on an button (e.g., object) in third display region 1300 for initiating a menu option for creating a video conference, a desired video conference may be created with information associated with each one of selected objects and automatically inform the created video conference to persons associated with each one of selected objects through e-mails or text messages. In case of the application for performing a predetermined operation, when a user makes a tab input on a button in third display region 1300 for initiating a menu option for executing the operation with the grouped tasks, a predetermined machine or system may be controlled to perform the group of the selected tasks in a predetermined order.

The diagram (a) of FIG. 1 shows selecting and grouping through a single touch input. However, such operation may be performed through multi-touch input, such as a multi-swipe input. For example, as shown in a diagram (b) of FIG. 1, through multi-swipe input, three objects 1120, 1130, and 1140 are selected at the same time and moved from first display region 1100 to second display region 1200 at the same time. After moving, three objects 1120, 1130, and 1140 are grouped together with first object 1110, which is previously selected and moved from first display region 1100 to second display region 1200.

As described, such touch inputs (e.g., a tab touch input, a multi-tab touch input, a single swipe touch input, and a multi swipe touch input) are frequently used for a graphic user interface for providing a list of objects, allowing a user to select at least one of the objects for grouping, and performing a predetermined task based on the grouped objects. In accordance with at least one embodiment, correlation between a selected object in one display region and a desired operation to be performed with the selected object may be determined and visual and tactile feedback of a touch input made on the selected object may be controlled based on the determined correlation in order to enable a user to intuitively recognize the correlation between the selected object and the properties of the destination display region. Herein, properties of a destination display region may be equivalent to the properties of the desired operation to be performed. Through such visual and tactile feedback, a user might easily and intuitively determine whether a selected object is related to a desired operation to be performed and/or how much the selected object is related to the desired operation to be performed. Furthermore, a user might be protected from mistakenly selecting and moving an object from one display region to the other. That is, such user interface in accordance with at least one embodiment may reduce mistakes that a user might make and improve a success rate of a desired operation.

As described, attributes for visual and tactile feedback of a touch input made on an object may be controlled based on correlation between the selected object and the properties of the destination display region (e.g., the desired operation to be performed) in order to enable a user to intuitively recognize the correlation between the selected object and the destination display region in accordance with at least one embodiment. Hereinafter, such user interface will be described with reference to FIG. 2 to FIG. 7. For convenience and ease of understanding, an application for scheduling a video conference will be used as an example of an application (e.g., a software program) that the embodiments are applied to, but the present invention is not limited thereto. The present invention may be similarly applied to any applications for enabling a user to select at least one of candidate objects and to group the selected candidate objects to perform a desired operation.

FIG. 2 illustrates user equipment providing an interactive user interface that enables a user to intuitively recognize correlation between a selected object and a desired operation to be performed in accordance with at least one embodiment. Referring to FIG. 2, user equipment 100 may provide an interactive user interface that enables a user to intuitively recognize correlation between a selected object in one display region and a desired operation to be performed. Particularly, user equipment 100 may control attributes (e.g., visual and tactile feedback) of a touch input made on a predetermined object in a graphic user interface based on the correlation between the selected object and the destination display region in accordance with at least one embodiment.

User equipment 100 may provide a graphic user interface for an application that provides a list of candidate objects, enables a user to select at least one of the candidate objects and to create a group of tasks related to each selected object, and performs a predetermined operation based on executing the tasks in a predetermined order. For example, user equipment 100 may produce and display graphic user interface 1000 as a result of executing an application for scheduling a video conference. That is, graphic user interface 1000 may include first display region 1100 for providing a list of candidate persons and selecting at least one from the list, second display region 1200 for creating a video conference with the selected candidate persons, and third display region 1300 for menu options, as show in a diagram (b) of FIG. 2.

Through graphic user interface 1000, a user of user equipment 100 may create a video conference, select at least one candidate person from the list in first display region 1100, and swipe the selected at least one candidate person to second display region 1200. Then, user equipment 100 may automatically schedule the meeting with the selected candidate persons and inform the selected candidate persons of the meeting with details through an e-mail or a text message. For example, a user may make a single tab touch input on one of the objects displayed in first display region 1100 to select one candidate person from the list and continuously make a single swipe touch input on the selected object for moving the selected object from first display region 1100 to second display region 1200. Herein, first display region 1100 may be referred to as an object display region and second display region 1200 may be referred to as a destination display region.

For another example, a user may make a multi-tab touch input on more than two objects displayed in first display region 1100 to select more than two candidate persons from the list at the same time. A user may continuously make a multi-swipe touch input on the selected objects for moving the selected objects from first display region 1100 to second display region 1200 at the same time as shown in the diagram (b) of FIG. 2.

In accordance with at least one embodiment, user equipment 100 may determine correlation of the selected object to the desired operation to be performed with the selected object upon detection of a designated touch input made on the selected object. That is, user equipment 100 may detect a swipe touch input made on an object that is previously selected by a tab touch input. Upon the detection, user equipment 100 may determine correlation of the selected object to properties of a destination display region of the swipe touch input. The predetermined touch input may include a single swipe touch input, a multi-swipe touch input, a single drag and drop touch input, and a multiple drag and drop touch input. Based on the determination result, user equipment 100 may control attributes (e.g., visual and tactile feedback) of the swipe touch input to enable a user to intuitively recognize the correlation of the selected object to the destination display region while the user performs the swipe touch input.

For example, as shown in a diagram (b) of FIG. 2, a user may make multi-swipe touch input 2100 to move A object 1110, B object 1120, and C object 1130 from first display region 1100 to second display region 1200 at the same time. In this case, upon the detection of multi-swipe touch input 2100, user equipment 100 may determine correlation between selected objects 1110, 1120, and 1130 and properties of the destination display region of the multi-swipe touch input. Herein, the properties of the destination display region may be equivalent to the properties of the desired operation to be performed with the selected object. Based on the determination, user equipment 100 may control attributes for visual and tactile feedback of the swipe touch inputs. The attributes of the swipe touch input may be used to determine a visual and tactile feedback of the swipe touch input. For example, when A object 1110 is a person who must be participated in a desired video conference, user equipment 100 may determine selected object 1110 as a candidate person highly related to the desired video conference which is a purpose of producing and displaying second display region 1200. When B object 1120 is a person who might be required for the desired video conference, user equipment 100 may determine selected B object 1120 as a candidate person lowly related to the desired video conference. When C object 1130 is a person who is prohibited from participating in the desired video conference, user equipment 100 may determine selected C object 1130 as a prohibited person not related to the desired meeting.

In accordance with at least one embodiment, user equipment 100 may control feed attributes of visual and tactile feedback for the swipe touch input made on A object 1110 in order to provide visual and tactile feedback of the swipe touch input discriminately according to the determination. The feedback attributes of the swipe touch input may include a resistance level. For example, since B object 1120 was determined as highly related to the destination display region, user equipment 100 may assign a comparatively low resistance level, as the feedback attribute, to the swipe touch input made on B object 1120 in order to make a user feel easily and lightly moving B object 1120 from the object display region to the destination display region. Furthermore, user equipment 100 may display B object 1120 moving closely followed by the swipe touch input.

Since C object 1130 was determined as less related to the destination display region, user equipment 100 may assign a comparatively high resistance level as the feedback attributes to the swipe touch input made on C object 1130. In this case, user equipment 100 may output tactile feedback of the swipe touch input to make a user feel heave to move C object 1130. Furthermore, user equipment 100 may display C object 1130 moving slower than the swipe touch input made on C object 1130 and following the swipe touch input with a predetermined distance.

Since D object 1140 was determined as not related to the destination display region, user equipment 100 may assign a highest resistance level as the feedback attributes to the swipe touch input made on D object 1140. In this case, user equipment 100 may output tactile feedback of the swipe touch input to make a user feel not to move D object 1140. Furthermore, user equipment 100 may display D object 1140 not moving into second display region 1200, as shown in the diagram (b) of FIG. 2.

In addition, user equipment 100 may detect attributes of a touch input made on the selected object and determine an order of displaying the selected objects in the destination display region (e.g., second display region 1200) or determine an order of executing the selected objects in second display region 1200 based on the detected attributes. After moving selected objects in the destination display region, user equipment 100 automatically and sequentially display the objects in an order based on the determined order. Furthermore, user equipment 100 may perform a predetermined operation by sequentially performing tasks each associated with the objects in the destination display region in the determined order.

Such user equipment 100 may be any electronic device having a processing power and a memory with communication capability. For example, user equipment 100 may include a smartphone, a table personal computer, or any other hand-held device utilizing Personal Communication System (PCS), Global System for Mobile Communication (GSM), Personal Digital Cellular (PDC), Personal Handyphone System (PHS), Personal Digital Assistant (PDA), International Mobile Telecommunication-2000 (IMT-2000), Code Division Multiple Access (CDMA)-2000, W-Code Division Multiple Access (W-CDMA), and Wireless Broadband Internet (Wibro).

In order to provide such interactive user interface, user equipment 100 may be installed with a predetermined application or program. Such a predetermined application or program may be installed when user equipment 100 is initially manufactured. Alternatively, such a predetermined application or program may be downloaded from an associated server and installed therein. However, the present invention is not limited thereto. The predetermined application or program can be installed in user equipment 100 through various types of methods. Although the user interface was described as software program, the present invention is not limited thereto. For example, user equipment 100 may include an electric circuit for providing such a user interface.

The interactive user interface in accordance with at least one embodiment may be initiated by executing the interactive user interface application. That is, when user equipment 100 is initially powered on or when an operating system of user equipment 100 is initiated, the interactive user interface application is activated. However, the present invention is not limited thereto. Whenever a user activates the interactive user interface application, the interactive user interface is initiated and activated. After the initiation of the interactive user interface, user equipment 100 may control feedback attributes of designated touch inputs (e.g., a swipe touch input) when user equipment 100 detects the initiation of the designated touch input.

User equipment 100 may be coupled with various devices 101 to 103 through communication network 300 as shown in FIG. 2 to perform a desired operation. For example, user equipment 100 may be coupled to server 200 and other user equipment 101 to 104 through communication network 300. Communication network 300 may include a wired communication network and a wireless communication network. The wireless network may include WLAN (Wireless LAN), Wi-Fi, Wibro (Wireless Broadband), Bluetooth, LTE (Long Term Evolution), WiMAX (World Interoperability for Microwave Access), and HSDPA (High Speed Downlink Packet Access).

Server 200 may be a computing system of a related service provider. For example, server 200 may store information of objects displayed in first display region 1100 and provide stored information of the objects to user equipment 100 upon a request. The stored information may include a priority of each object. When user equipment 100 executes an application for a video conference, user equipment 100 may request information of each candidate person associated with an object displayed in first display region 1100 to server 200. In response to the request, server 200 may provide the requested information to user equipment 100. In this case, server 200 may be a server for providing a video conferencing service.

Figure 3:
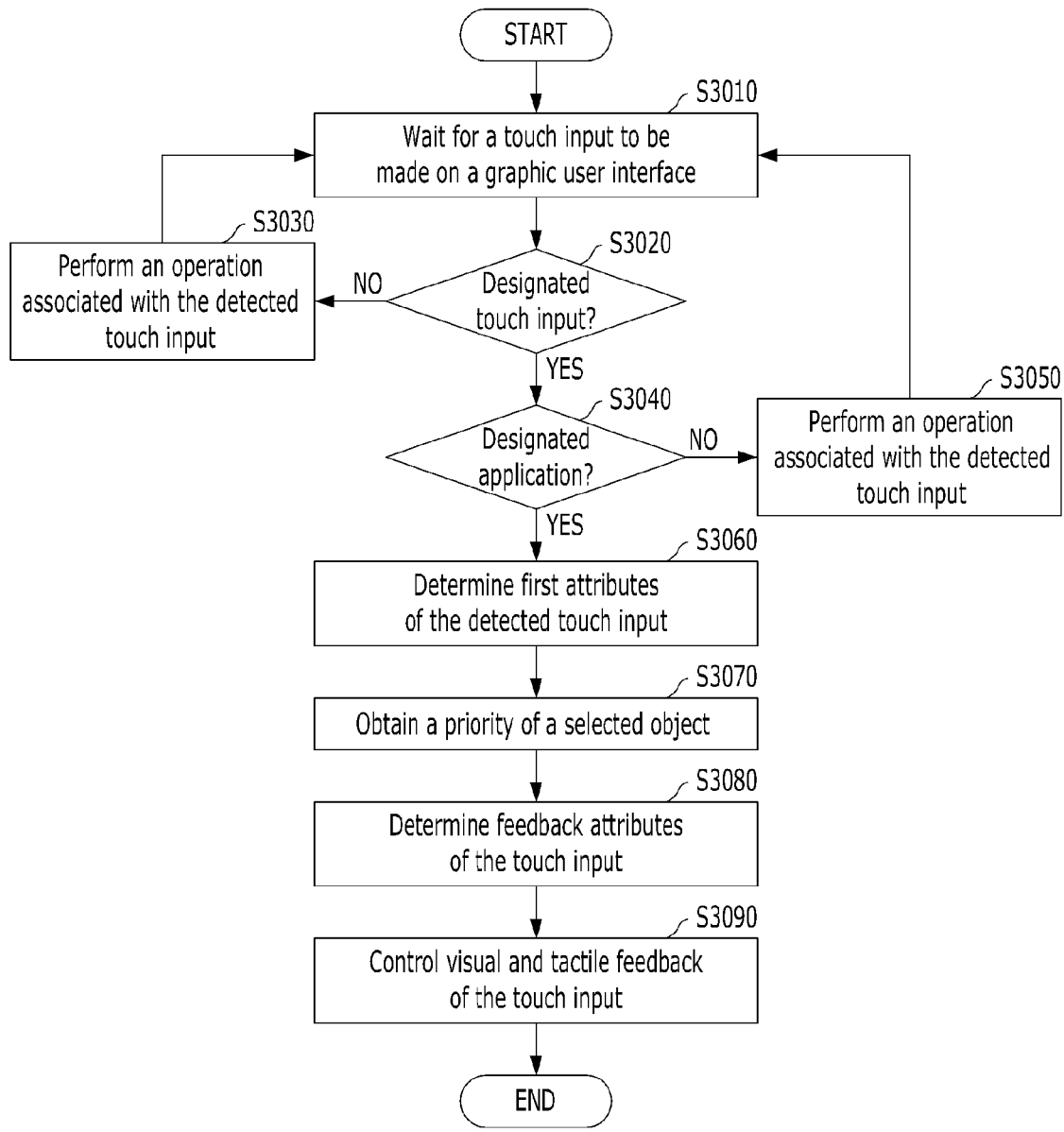
FIG. 3 illustrates a method for providing an interactive user interface that enables a user to intuitively recognize correlation between a selected object and a target operation in accordance with at least one embodiment.

Hereinafter, a method for controlling visual and tactile feedback of a touch input in accordance with at least one embodiment will be described with reference to FIG. 3. FIG. 3 illustrates a method for providing an interactive user interface that enables a user to intuitively recognize correlation between a selected object and a target operation in accordance with at least one embodiment.

Referring to FIG. 3, a touch input made on a graphic user interface may be detected at step S3010. For example, user equipment 100 may produce a graphic user interface as a result of executing a designated application and display the produced graphic user interface. Then, user equipment 100 may wait for a touch input made on the graphic user interface.

At step S3020, determination may be made so as whether the detected touch input is one of designated touch inputs for providing an interactive user interface. For example, the designated touch input may include a single drag touch input, a multi drag touch input, a single swipe touch input, and a multi swipe touch input, but the present invention is not limited thereto. The designated touch input may be any touch input that selects one object and moves the selected object from one display region to the other.

When the detected touch input is not the designated touch input (No—S3020), an operation associated with the detected touch input is performed at step S3030. After performing the associated operation, user equipment 100 may wait for another touch input at step S3010.

When the detected touch input is the designated touch input (Yes—S3020), determination may be made so as whether the detected touch input is made on a graphic user interface produced as a result of a designated application for the interactive user interface at step S3040. The designated application may be any application that provides a list of objects to select and performs a predetermined operation based on the selected object. For example, such a designated application may include a video conferencing application, as described above. Such a designated application may be determined and previously set by a system designer, a system operator, or a user. Furthermore, whenever a new application is installed in user equipment 100, user equipment 100 may inquiry a user whether the new application is a designated application for the interactive user interface. In response to the user's response, user equipment 100 may store the information on each installed application in memory 160.

When the associated application is not the designated application for the interactive user interface (No—S3040), an operation associated with the detected touch input is performed at step S3050. After performing the associated operation, user equipment 100 may wait for another touch input at step S3010.

When the associated application is the designated application for the interactive user interface (Yes—S3040), first attributes of the detected touch input may be determined by collecting information on the detected touch input at step S3060. For example, upon the detection of the designated touch input, touch sensor 1511 may collect information on the designated touch input (e.g., a swipe touch input) and transmit the collected information on the designated touch input to touch input attribute detection module 181. Then, touch input attribute detection module 181 may determine a touch input direction based on the collected information on the designated touch input and calculate a touch input speed based on the collected information on the designated touch input. Such determined touch input direction and the calculated touch input speed may be stored in in memory 160 in associated with information on the detected designated touch input.

At step S3070, a priority of a selected object may be obtained. The priority of the selected object may denote correlation between the selected object and the desired operation performed with the selected object. Such a priority of the selected object may be determined based on information obtained from an associated server.

For example, priority determination module 182 may determine a priority of the selected object. Such a priority of each object may be previously determined and stored in memory 160 of user equipment 100. Priority determination module 182 may obtain priority information on the selected object from memory 160 and determine the priority of the selected object. Alternatively, priority determination module 182 may obtain a priority assigned to a selected object and provide the obtained priority. Furthermore, such priority information or a priority assigned to a selected object may be obtained from associated server 200 for providing a video conferencing service.

At step S3080, feedback attributes for visual and tactile feedback of the detected touch input may be determined based on the determined first attributes of the detected touch input and the obtained priority of the selected object. For example, feedback attribute determination module 183 may determine a resistance level of the detected designated touch input based on the obtained priority of the selected object and the determined touch input attributes. Feedback attribute determination module 183 may assign a comparatively high resistance level to an object having a comparatively high priority. That is, the higher the priority of selected object is, the lower the resistance level is assigned as a visual and tactile feedback of an associated touch input. In other words, the selected object is not less related to the desired operation to be performed with the selected object, a lower priority is assigned to the selected object and a lower resistance level is assigned as a visual and tactile feedback for the associated touch input. Feedback attribute determination module 183 may store the calculated resistance level in memory 160.

At step S3090, visual and tactile effects of the detected touch input may be controlled based on the determined visual and tactile feedback attributes. For example, output device 150 may receive the resistance level assigned to the detected touch input and apply the received resistance level to output the visual and tactile feedback of the detected designated touch input through at least one of display 151 and haptic device 153. For example, when the high resistance level is assigned to the detected designated touch input, display 151 may display the selected object moving slowly from one point to the other followed by the detected touch input and tactile circuit 153 may generate tactile feedback of the detected touch input to make a user feel moving a heavy object.

Hereinafter, user equipment 100 and operation thereof for providing an interactive user interface in accordance with at least one embodiment will be described in detail with reference to FIG. 4 to FIG. 7.

Figure 4:
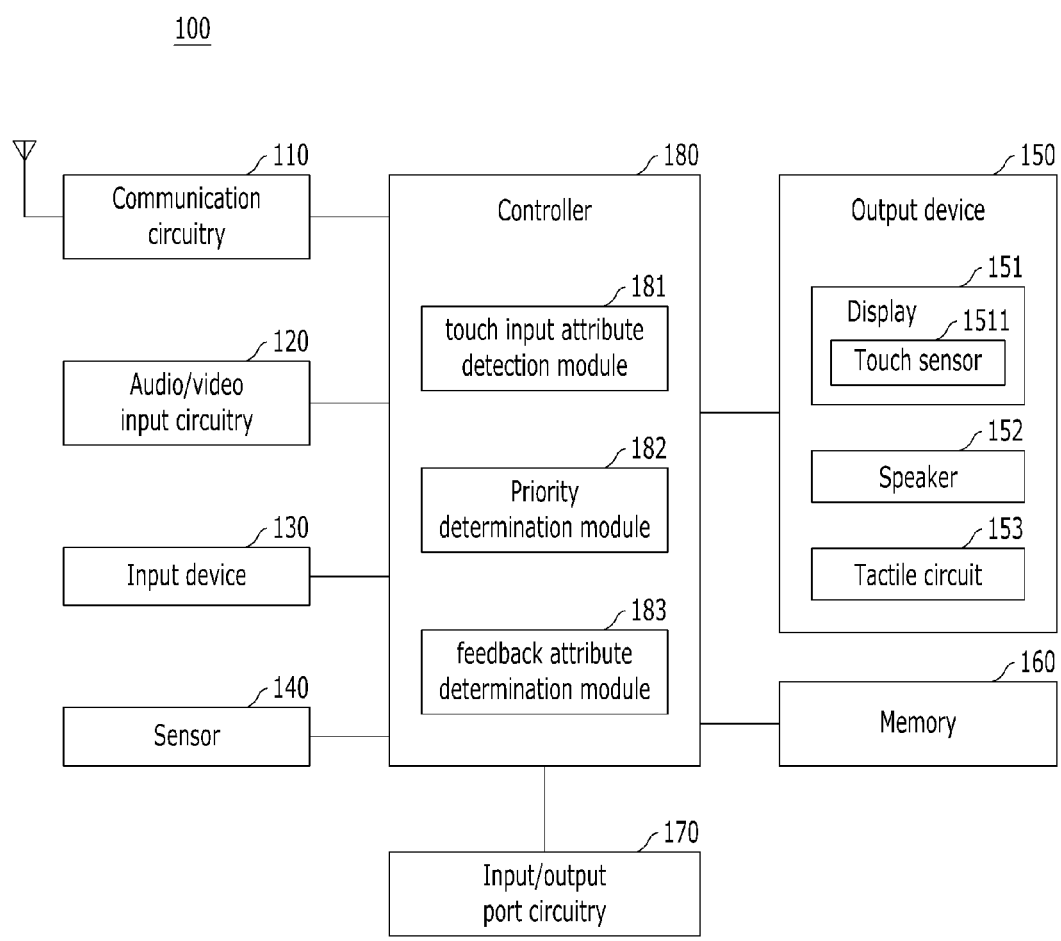
FIG. 4 illustrates user equipment for providing an interactive user interface in accordance with at least one embodiment.

FIG. 4 illustrates user equipment for providing an interactive user interface in accordance with at least one embodiment. Referring to FIG. 4, user equipment 100 may provide an interactive user interface that enables a user to intuitively recognize correlation between a selected object and a desired operation to be performed with the selected object. Such user equipment 100 may include communication circuitry 110, audio/video input circuitry 120, input device 130, sensor 140, output device 150, memory 160, input/output port circuitry 170, and controller 180. Controller 180 may include touch input attribute detection module 181, priority determination module 182, and feedback attribute determination module 183.

Communication circuitry 110 transmits and receives signals to/from other entities through a communication network based on various types of communication schemes. Communication circuitry 110 may be referred to as a transceiver and include at least one of a mobile communication circuit, a wireless internet circuit, a near field communication (NFC) circuit, a global positioning signal receiving circuit, and so forth. Particularly, communication circuit 110 may include a short distance communication circuit for short distance communication, such as NFC, and a mobile communication circuit for long range communication through a mobile communication network, such as long term evolution (LTE) communication or wireless data communication (e.g., WiFi).

Audio/video input circuitry 120 may receive audio/video input, such as an audio signal and/or a video signal. For example, audio/video input circuitry 120 may be a camera for capturing images and/or a microphone for recording sound. The camera may process image frames of a still image or a moving image, which are captured by an image sensor in a video call mode or a photographic mode. The processed image frames may be output through display 151.

Input device 130 may be a user interface for receiving an input from a user. Input device 130 may be realized in various types. For example, input device 130 may be realized as a touch keypad integrated with display 151. Sensor 140 may detect various events occurring in association with user equipment 100. For example, sensor 140 may sense an opening or a closing of a cover of user equipment 100, a physical contact with or a proximity to a user, a location and a bearing of user equipment 100, or acceleration and deceleration of user equipment 100. Based on the detected status of user equipment 100, sensor 140 may generate a sensing signal to control the operation of user equipment 100.

Output device 150 may be a device for outing video, audio, or tactile feedback. Output device 150 may include display 151, speaker 152, and tactile circuit 153, but the present invention is not limited thereto.

Display 151 may display information processed on user equipment 100. Display 151 may display a graphic user interface for various types of service applications. For example, display 151 may display a graphic user interface for a video conferencing application. Furthermore, display 151 may display various types of graphic effects (e.g., visual feedback) of touch inputs made on the graphic user interface with visual and tactile feedback. Tactile circuit 153 may output tactile effects (e.g., tactile feedback) of touch inputs. Such visual and tactile feedbacks may be controlled according to correlation between a selected object and a desired operation to be performed with the selected object in accordance with at least one embodiment. Display 151 may be a liquid crystal display, a thin film transistor-liquid crystal display, an organic light-emitting diode, a flexible display, or 3D display, but is not limited thereto.

Display 151 may be a touch screen configured to receive inputs and to display information simultaneously. Display 151 may include touch sensor 1511 layered on or beneath display 151. Touch sensor 1511 is configured to detect a touch input. Touch sensor 1511 may be a touch film, a touch sheet, or a touch pad, but the present invention is not limited thereto. Touch sensor 1511 may be configured to convert a pressure applied to or a change in capacitance around a particular place on display 151 into an electric input signal. Touch sensor 1511 may detect a pressure, a particular location where a touch input is made, or a direction of a touch input. When touch sensor 1511 detects a touch input, touch sensor 1511 sends a corresponding electric input signal to a touch controller. The touch controller processes the electric input signal and sends a corresponding data to main controller 180. The touch controller determines an area of display 151 where the touch input is made.

In accordance with at least one embodiment, touch sensor 1511 may detect touch inputs made on a graphic user interface displayed on display 151. For example, touch sensor 1511 may detect single touch input made on a predetermined object or a multi-touch input made on multiple objects displayed through a graphic user interface displayed on display 151. Furthermore, touch sensor 1511 may collect information on the detected touch input and provide the collected information to main controller 180.

Memory 160 stores various types of data including operating system for controlling user equipment 100 and at least one application necessary for providing the interactive user interface that enables a user to intuitively recognize correlation between a selected object and a desired operation to be performed with the selected object. For example, memory 160 may store software programs for operating user equipment 100. Memory 160 may also store input/output data including a phonebook, a message, a still image, or a video. Memory 160 may store data related to various vibration patterns or sound effects which are outputted in response to user input made on display 151. Memory 160 may be a flash memory, a hard disk, a multimedia card micro memory, a SD or XD memory, a Random Access Memory (RAM), a Static Random Access Memory (SRAM), a Read-Only Memory (ROM), a Programmable Read-Only Memory (PROM), an Electrically Erasable Programmable Read-Only Memory (EEPROM), a magnetic memory, a magnetic disk, or an optical disc, but the present invention is not limited thereto.

User equipment 100 may be coupled to an external device through input/output port circuitry 170. Input/output port circuitry 170 may receive data or power from the external device and may deliver data or power to the constituent elements of user equipment 100. Input/output port circuitry 170 may include a wired/wireless headset port, an external power source port, a wired/wireless data port, a memory card port, an audio input/output port, a video input/output port, an earphone port, or any port configured to be coupled to device with identification module.

Controller 180 may be a central processing circuitry that controls constituent elements of user equipment 100 based on inputs received from a user. For example, controller 180 executes a software program and/or an instruction set stored in memory 160 to perform various operations necessary to drive user equipment 100.

In accordance with at least one embodiment, controller 180 may perform operations related to providing an interactive user interface for enabling a user to intuitively recognize correlation between a selected object and a desired operation to be performed with the selected object. For example, controller 180 may perform operations related to controlling visual and tactile feedback of a designated touch input made on a selected object based on correlation between the selected object and the desired operation to be performed. In order to perform such operation, controller 180 may include touch input attribute detection module 181, priority determination module 182, and feedback attribute determination module 183. Such modules may be implemented as software module, but the present invention is not limited thereto. Such modules may be implemented as hardware circuits.

Touch input attribute detection module 181 may determine attributes of a designated touch input made on a predetermined object for moving the predetermined object from one display region to the other. The attributes of the designated touch input may be referred to as first attribute. For convenience and ease of understanding, the designated touch input will be described as a single swipe touch input or a multi swipe touch input, but the present invention, is not limited thereto. The designated touch input may be any touch input that enables a user to move a selected object from one display region to the other.

Such attributes may be determined based on information on the detected designated touch input, which is collected by and transmitted from touch sensor 1511. For example, touch input attribute detection module 181 may receive the collected information on the detected designated touch input from touch sensor 1511. The collected information may include information on an initial location of a designated touch input made on a graphic user interface, information on a traveling location of the designated touch input traveling from the initial location, and information on a traveling direction of the detected designated touch input. Based on the information from touch sensor 1511, touch input attribute detection module 181 determines at least one of touch input attributes, as first attributes, including a touch input direction of a designated touch input and a touch input speed of a designated touch input. Furthermore, based on the information from touch sensor 1511, touch input attribute detection module 181 determines a pressure level of the designated touch input.

For example, the touch input direction may include a planar direction within 360 degrees from an origin or a three dimensional direction in a three dimension space from an origin. The touch input direction may include an up direction, a down direction, a left direction, a right direction, or a diagonal direction. The touch input direction may be determined based on information on the initial location and the traveling direction of the designated touch input. The touch input speed of the designated touch input may be measured based on time difference between detection time of the initial location and detection time of the traveling location. However, the present invention is not limited to one specific method for determining a touch input direction and a touch input speed. For example, a touch input direction and a touch input speed may be determined through various methods.

Figure 5:
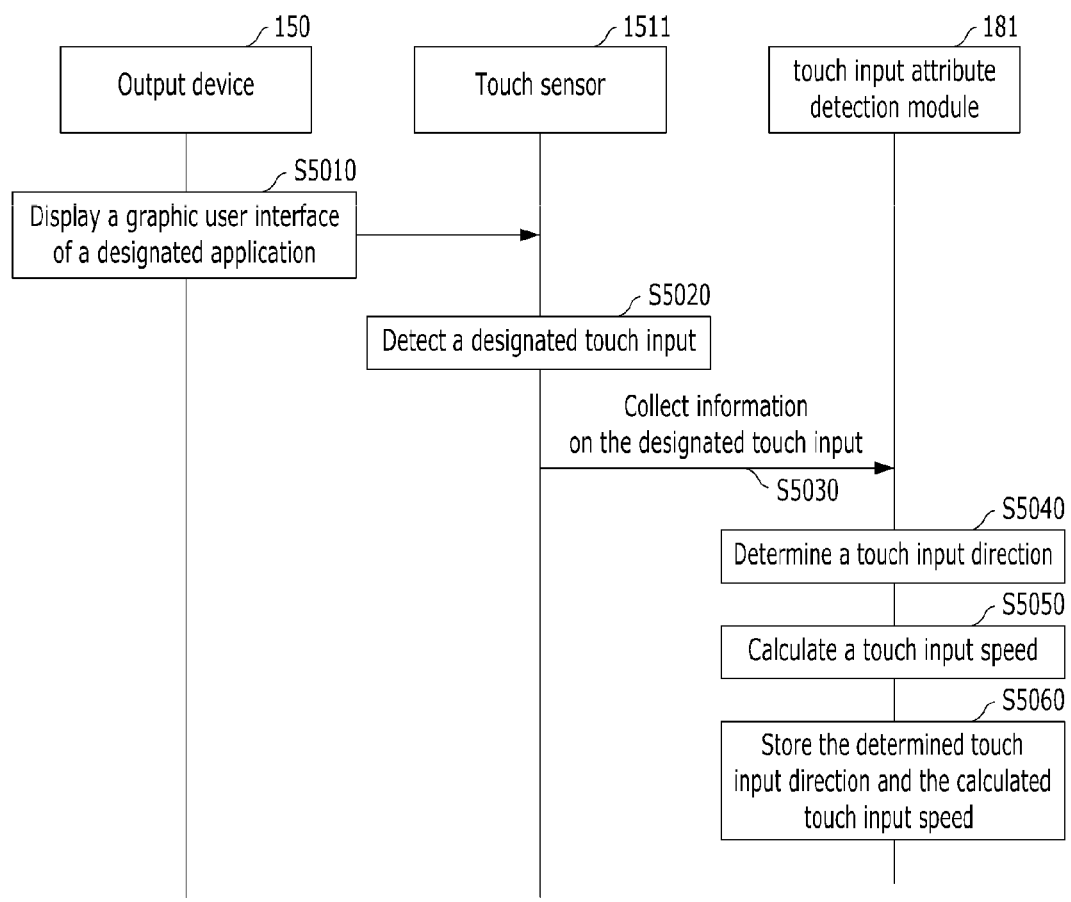
FIG. 5 illustrates a method for determining touch input attributes in accordance with at least one embodiment.

Such a method for determining touch input attributes will be described in reference to FIG. 5, hereinafter. FIG. 5 illustrates a method for determining touch input attributes in accordance with at least one embodiment. Referring to FIG. 5, output device 150 may display a graphic user interface produced as a result of executing a designated application such as a video conferencing application at step S5010. At step S5020, touch sensor 1511 may detect a designated touch input made on a selected object displayed in the graphic user interface. Upon the detection of the designated touch input, touch sensor 1511 may collect information on the designated touch input (e.g., a swipe touch input) and transmit the collected information on the designated touch input to touch input attribute detection module 181 at step S5030.

At step S5040, touch input attribute detection module 181 may determine a touch input direction based on the collected information on the designated touch input. At step S5050, touch input attribute detection module 181 may calculate a touch input speed based on the collected information on the designated touch input. At step S5060, touch input attribute detection module 181 may store the determined touch input direction and the calculated touch input speed in memory 160 in associated with information on the detected designated touch input.

Referring back to FIG. 4, controller 180 may further include priority determination module 182 for determining a priority of a selected object where the designated touch input is made on. For example, after detecting the touch input attributes of the detected designated touch input, priority determination module 182 may determine a priority of a selected object in an object display region. The priority of the selected object may represent correlation between the selected object and properties of a desired operation to be performed with the selected object. The properties of the desired operation may be equivalent to the priorities of a destination display region of the detected designated touch input (e.g., a swipe touch input) because the destination display region is produced and displayed for performing the desired operation that will be performed with the selected objects in the object display region after the selected objects are moved from the object display region to the destination display region through the designated touch input (e.g., swipe touch input).

As described, the priority of a selected object may represent correlation between the object and a desired operation to be performed with the selected object. That is, if the selected object is strongly related to the desired operation (e.g. properties of the destination display region), the selected object may be assigned with a comparatively high priority. If the selected object is weakly related to the desired operation, the selected object may be assigned with a comparatively low priority. Such priority of a selected object may be previously set by at least one of a system designer, a system operator, a user, and so forth. Such priority of a selected object may be determined based on information on a selected object, which is collected and obtained based on a history of previously performing the desired operations.

For example, when a designated touch input (e.g., a swipe touch input) is detected from a graphic user interface produced as a result of a video conference application, an object selected from a list represents a candidate person to participate a desired video conference. In this case, the priority of the selected object may represent correlation between the selected candidate person and the properties of the desired video conference. That is, the priority of the selected object may be determined based on a history of previous video conferences having the same title. That is, history information on the video conference having the same title may be analyze to determine how often the selected candidate person participates a video conference with the same title, what is a roll of the selected candidate persons in the video conference, and so forth.

Such a priority of each object may be previously determined and stored in memory 160. Priority determination module 182 may obtain priority information on the selected object from memory 160 and determine the priority of the selected object. Alternatively, priority determination module 182 may obtain a priority assigned to a selected object and provide the obtained priority. Furthermore, such priority information or a priority assigned to a selected object may be obtained from associated server 200 for providing a video conferencing service.

As described, controller 180 may further include feedback attribute determination module 183 for determining and controlling visual and tactile feedback of the detected touch input based on the determined touch input attributes and the obtained priority of the selected object. Such a visual and tactile feedback attribute may be referred to as second attributes in the specification. That is, feedback attribute determination module 183 may determine attributes of the visual and tactile feedback of the detected designated touch input based on correlation between the selected object and the desired operation to be performed with the selected object.

The attributes of the visual and tactile feedback of the detected touch input may be i) feedback attributes of a visual feedback for displaying the detected touch input with the selected object during moving the selected object from one display region to the other and ii) feedback attributes of a tactile feedback for outputting a tactile feedback of the detected touch input. The feedback attributes of the visual feedback may relate to relation between a speed of a detected touch input moving one point to the other and a speed of displaying a selected object moving one point to the other, which follows the detected touch input. The feedback attributes of the tactile feedback may relate to a weight Based on the feedback attributes of the visual and tactile feedback of the detected touch input, user equipment 100 decides how to display the selected object with the touch input, which move from one point to the other, on the graphic user interface or decides how to produce visual and tactile feedback of the detected touch input through display 151, speaker 152, haptic circuit 153, and so forth. In addition, the selected object may be displayed with various colors according to a priority thereof.

Figure 6:
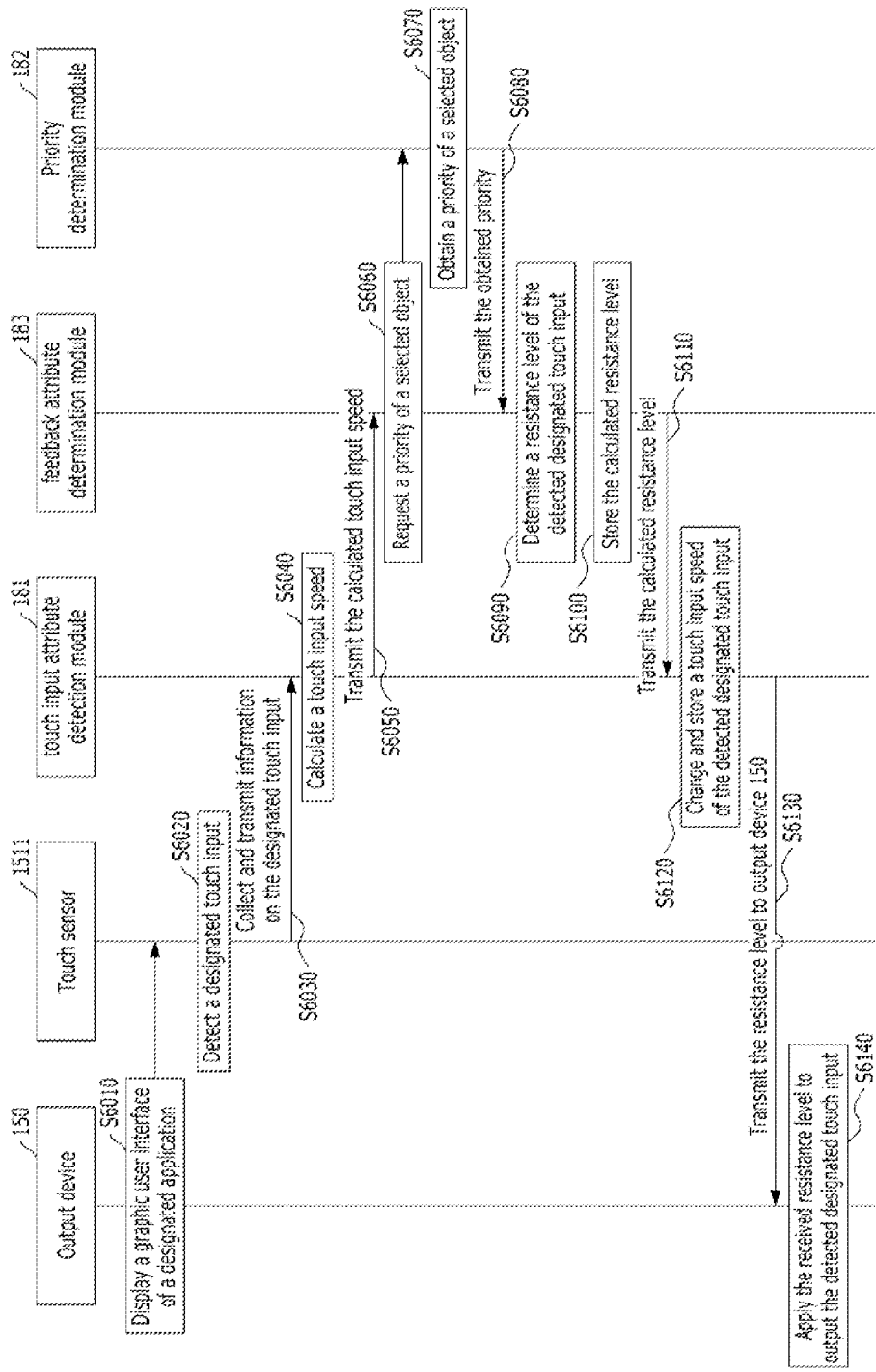
FIG. 6 illustrates a method for determining feedback attributes of a designated touch input in accordance with at least one embodiment.

Hereinafter, an operation of feedback attribute determination module 183 will be described in detail with reference to FIG. 6. FIG. 6 illustrates a method for determining feedback attributes of a designated touch input in accordance with at least one embodiment. Referring to FIG. 6, output device 150 may display a graphic user interface produced as a result of executing a designated application such as a video conferencing application at step S6010. At step S6020, touch sensor 1511 may detect a designated touch input made on a selected object displayed in the graphic user interface. Upon the detection of the designated touch input, touch sensor 1511 may collect information on the designated touch input (e.g., a swipe touch input) and transmit the collected information on the designated touch input to touch input attribute detection module 181 at step S6030.

At step S6040, touch input attribute detection module 181 may calculate a touch input speed based on the collected information on the designated touch input. At step S6050, touch input attribute detection module 181 may transmit the calculated touch input speed to feedback attribute determination module 183. At step S6060, feedback attribute determination module 183 may request a priority of a selected object to priority determination module 182.

Upon the request, priority determination module 182 may obtain a priority of a selected object at step S6070 and transmit the obtained priority to feedback attribute determination module 183 at step S6080.

At step S6090, feedback attribute determination module 183 may determine a resistance level of the detected designated touch input, as a feedback attribute of a visual and tactile feedback for a detected touch input, based on the obtained priority of the selected object and the determined touch input attributes.

For example, feedback attribute determination module 183 may assign a comparatively high resistance level to an object having a comparatively high priority. That is, the higher the priority of selected object is, the lower the resistance level is assigned as a visual and tactile feedback of an associated touch input. In other words, when the selected object is not less related to the desired operation to be performed with the selected object, a lower priority is assigned to the selected object and a lower resistance level is assigned as a visual and tactile feedback for the associated touch input.

At step S6100, feedback attribute determination module 183 may store the calculated resistance level in memory 160. At step S6110, feedback attribute determination module 183 may transmit the calculated resistance level to touch input attribute determination module 181.

At step S6120, touch input attribute determination module 181 may change a touch input speed of the detected designated touch input based on the received resistance level and store the changed touch input speed in memory 160. At step S6130, touch input attribute determination module 181 may transmit the resistance level to output device 150.

At step S6140, output device 150 may apply the received resistance level to output the visual and tactile feedback of the detected designated touch input through at least one of display 151 and haptic device 153. For example, when the high resistance level is assigned to the detected designated touch input, display 151 may display the selected object moving slowly from one point to the other followed by the detected touch input and haptic circuit 153 may generate tactile feed of the detected touch input to make a user to feel moving a heavy object.

In addition, controller 180 may determine a location of displaying a selected object in a destination display region based on the collected information of a designated touch input made related to the selected object. For example, based on the collected information, a touch input speed may be calculated. The higher the touch input speed is, the upper the location of displaying the selected object in the destination display region becomes. That is, when the touch input speed is comparatively high, an associated object is displayed in a comparatively upper location of the destination display region.

For example, touch input speeds associated with objects in a destination display region may be sorted in a descending order and the objects are displayed from top to bottom in the destination display region based on the determined sorting order. As another example, locations of displaying objects in a destination display region may be determined based on a priority of each object.

In addition, display 151 may display detailed information on a selected object in first display region and second display region. For example, when a long tab touch input is made an object in first display region and second display region, a pop-up window may be displayed in association with the selected object and detailed information on the selected object is displayed within the pop-up window. The detailed information may include a rank, a major roll for a desired project, a picture, a contact information, and so forth.

Figure 7:
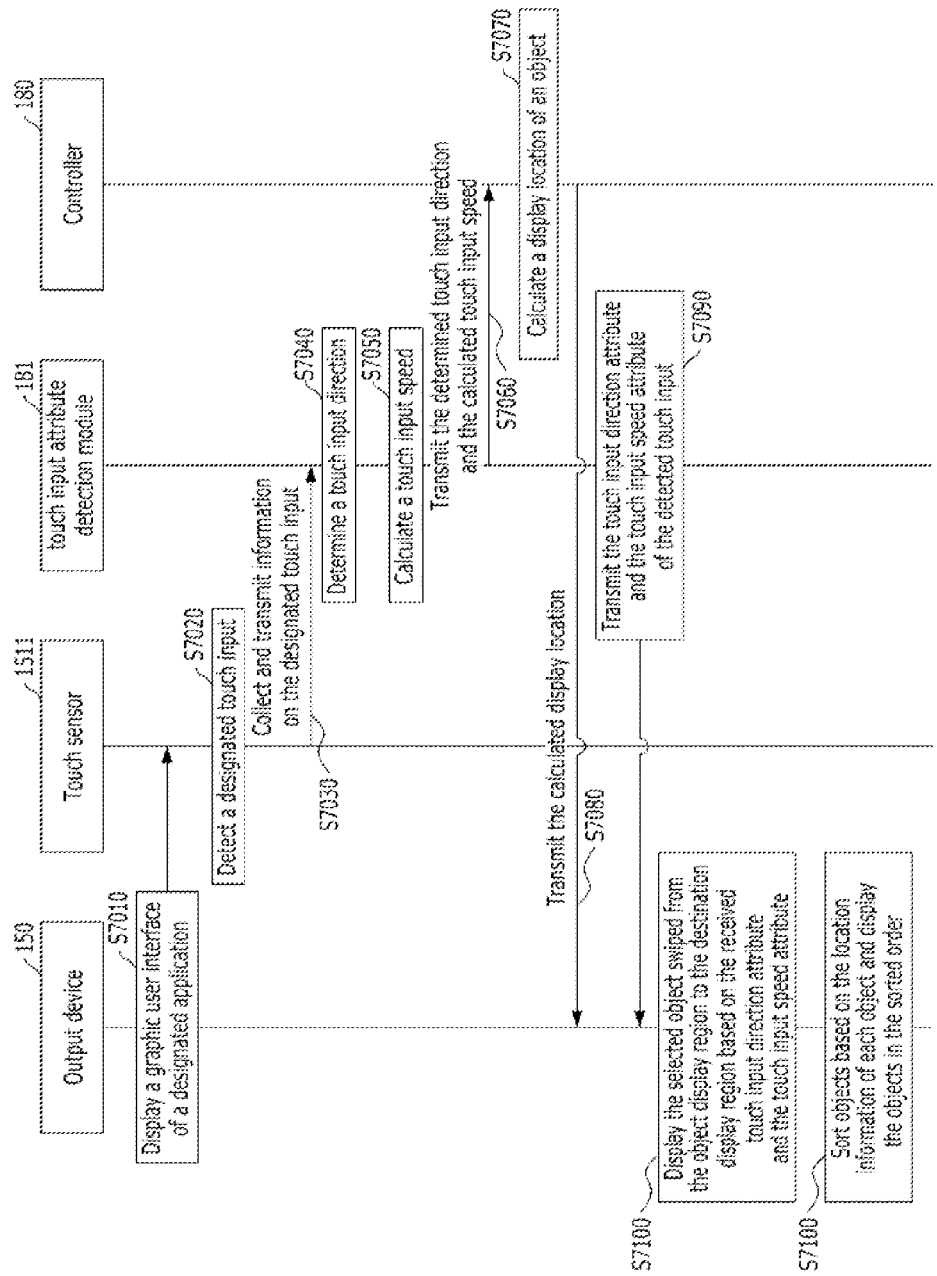
FIG. 7 illustrates a method for displaying objects in a second display region after moving the objects from a first display region to the second display region through a touch input in accordance with at least one embodiment.

Hereinafter, a method for displaying objects in a second display region (e.g., a destination display region) will be described with reference to FIG. 7. FIG. 7 illustrates a method for displaying objects in a second display region after moving the objects from a first display region to the second display region through a touch input in accordance with at least one embodiment. Referring to FIG. 7, output device 150 may display a graphic user interface produced as a result of executing a designated application such as a video conferencing application at step S7010. At step S7020, touch sensor 1511 may detect a designated touch input made on a selected object displayed in the graphic user interface. Upon the detection of the designated touch input, touch sensor 1511 may collect information on the designated touch input (e.g., a swipe touch input) and transmit the collected information on the designated touch input to touch input attribute detection module 181 at step S7030.

At step S7040, touch input attribute detection module 181 may determine a touch input direction based on the collected information on the designated touch input. At step S7050, touch input attribute detection module 181 may calculate a touch input speed based on the collected information on the designated touch input. At step S7060, touch input attribute detection module 181 may transmit the determined touch input direction and the calculated touch input speed to controller 180.

At step S7070, controller 180 may calculate a location of a swiped object in the destination display region based on the determined touch input direction and the determined touch input speed. At step S7080, controller 180 may transmit the calculated location to output device 150.

At step S7090, touch input attribute detection module 181 may transmit the touch input direction attribute and the touch input speed attribute of the detected touch input to output device 151. At step S7100, output device 150 may display the selected object swiped from the object display region to the destination display region based on the received touch input direction attribute and the touch input speed attribute. At step S7110, output device 150 may sort objects in the destination display region based on the location information of each object, received from controller 180.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation."

As used in this application, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

Additionally, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, the terms "system," "component," "module," "interface,", "model" or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

The present invention can be embodied in the form of methods and apparatuses for practicing those methods. The present invention can also be embodied in the form of program code embodied in tangible media, non-transitory media, such as magnetic recording media, optical recording media, solid state memory, floppy diskettes, CD-ROMs, hard drives, or any other machine-readable storage medium, wherein, when the program code is loaded into and executed by a machine, such as a computer, the machine becomes an apparatus for practicing the invention. The present invention can also be embodied in the form of program code, for example, whether stored in a storage medium, loaded into and/or executed by a machine, or transmitted over some transmission medium or carrier, such as over electrical wiring or cabling, through fiber optics, or via electromagnetic radiation, wherein, when the program code is loaded into and executed by a machine, such as a computer, the machine becomes an apparatus for practicing the invention. When implemented on a general-purpose processor, the program code segments combine with the processor to provide a unique device that operates analogously to specific logic circuits. The present invention can also be embodied in the form of a bitstream or other sequence of signal values electrically or optically transmitted through a medium, stored magnetic-field variations in a magnetic recording medium, etc., generated using a method and/or an apparatus of the present invention.

It should be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments of the present invention.

As used herein in reference to an element and a standard, the term "compatible" means that the element communicates with other elements in a manner wholly or partially specified by the standard, and would be recognized by other elements as sufficiently capable of communicating with the other elements in the manner specified by the standard. The compatible element does not need to operate internally in a manner specified by the standard.

No claim element herein is to be construed under the provisions of 35 U.S.C. §112, sixth paragraph, unless the element is expressly recited using the phrase "means for" or "step for."

Although embodiments of the present invention have been described herein, it should be understood that the foregoing embodiments and advantages are merely examples and are not to be construed as limiting the present invention or the scope of the claims. Numerous other modifications and embodiments can be devised by those skilled in the art that will fall within the spirit and scope of the principles of this disclosure, and the present teaching can also be readily applied to other types of apparatuses. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A method of providing an interactive user interface, the method comprising:
   detecting a designated touch input made on an object for moving the object from a first display region to a second display region in a graphic user interface;
   selecting the object associated with the detected designated touch input and obtaining a priority of the selected object;
   determining feedback attributes of the detected designated touch input based on the obtained priority of the selected object; and
   outputting visual and tactile feedback of the detected designated touch input based on the determined feedback attributes,
   wherein the priority represents correlation between the selected object and a desired operation to be performed with the selected object.

2. The method of claim 1, wherein the obtaining a priority comprises:
   obtaining priority information in associated with the selected object from a memory of a user equipment; and
   determining the priority of the selected object based on the obtained priority information.

3. The method of claim 1, wherein the obtaining a priority comprises:
   obtaining the priority previously assigned to the selected object.

4. The method of claim 1, wherein the obtaining a priority comprises:
   requesting priority information to an associated server and receiving the requested priority information from the associated server; and
   determining the priority of the selected object based on the received priority information.

5. The method of claim 1, prior to the obtaining a priority, comprising:
   detecting a touch input made on the graphic user interface;
   determining whether the detected touch input is the designated touch input;
   performing the obtaining a priority of a selected object when the detected touch input is determined as the designated touch input.

6. The method of claim 1, wherein the designated touch input is a touch input that moves at least one object from one display region to the other in the graphic user interface.

7. The method of claim 1, wherein the designated touch input includes at least one of a single drag touch input, a multi drag touch input, a single swipe touch input, and a multi swipe touch input.

8. The method of claim 1, prior to the obtaining a priority, comprising:
   determining whether the designated touch input is made on a graphic user interface produced as a result of a designated application; and
   performing the obtaining a priority of a selected object when the designated touch input is determined as making on a graphic user interface produced as a result of a designated application.

9. The method of claim 1, wherein the determining feedback attribute of the detected designated touch input comprises:
   determining touch input attributes of the detected designated touch input;
   determining the feedback attributes of the detected designated touch input based on the determined touch input attributes together with the priority of the selected object.

10. The method of claim 9, wherein the determining touch input attributes comprising:
    collecting information on the detected designated touch input;
    determining a touch input direction, as the touch input attribute, based on the collected information; and
    calculating a touch input speed, as the touch input attribute, based on the collected information.

11. The method of claim 10, wherein the collected information includes at least one of information on an initial location of detecting the designated touch input, information on a traveling location of the detected designated touch input, and information on a traveling direction of the detected designated touch input.

12. The method of claim 1, wherein the determining feedback attributes of the detected designated touch input comprises:
    determining a resistance level, as the feedback attributes, in proportional to a level of the obtained priority of the selected object; and
    assigning the determined resistance level to the detected designated touch input associated with the selected object.

13. The method of claim 1, wherein the determining feedback attributes of the detected designated touch input comprising:
    assigning a comparatively high resistance level, as the feedback attribute, to the detected designated touch input associated with the selected object having a comparatively high priority; and
    assigning a comparatively low resistance level, as the feedback attribute, to the detected designated touch input associated with the selected object having a comparatively low priority.

14. The method of claim 1, wherein the outputting visual and tactile feedback of the detected designated touch input comprises:
    determining feedback attributes assigned to the detected designated touch input; and controlling visual and tactile feedback of the detected designated touch input to enable a user to intuitively recognize correlation between the selected object and a desired operation to be performed with the selected object while performing the detected designated touch input.

15. The method of claim 1, wherein the outputting visual and tactile feedback of the detected designated touch input comprises:
   determining a resistance level assigned to the detected designated touch input;
   controlling visual and tactile feedback of the detected designated touch input based on the determined resistance level.

16. The method of claim 15, wherein controlling visual and tactile feedback of the detected designated touch input based on the determined resistance level comprises:
   when the assigned resistance level is comparatively low, displaying, through a display device, the selected object moving comparatively slow and followed by the detected designated touch input with a predetermined distance, and generating tactile feedback of the detected designated touch input to make a user feel moving a heavy object; and
   when the assigned resistance level is comparatively high, displaying the selected object moving comparatively fast and closely followed by the detected designated touch input, and generating tactile feedback of the detected designated touch input to make a user feel moving a light object.

17. The method of claim 1, comprising:
   displaying objects in the second display region in a predetermined order based on a priority assigned to each object after the objects are moved from the first display region to the second display region.

18. The method of claim 17, wherein the displaying objects comprises:
   obtaining priorities of the objects in the second display region;
   sorting the objects based on the obtained priority; and
   determining a display location of each object in the second display region according to the sorting order.

19. User equipment of providing an interactive user interface that enables a user to intuitively recognize correlation between a selected object and a desired application to be performed with the selected object, user equipment is configured to:
   detect a designated touch input made on an object for moving the object from a first display region to a second display region in a graphic user interface;
   select the object associated with the detected designated touch input and obtain a priority of the selected object;
   determine feedback attributes of the detected designated touch input based on the obtained priority of the selected object; and
   output visual and tactile feedback of the detected designated touch input based on the determined feedback attributes,
   wherein the priority represents correlation between the selected object and a desired operation to be performed with the selected object.

* * * * *